Figure 1:
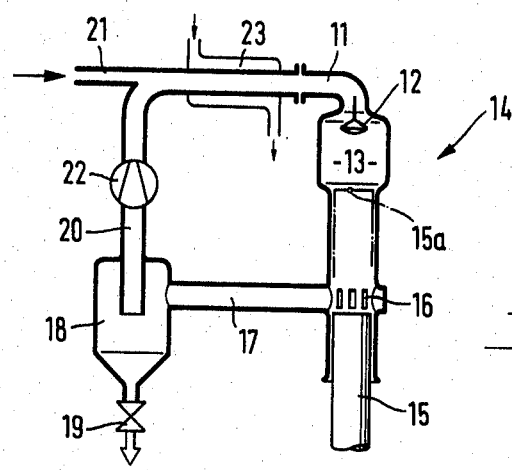

United States Patent [19]

Bauer

[11] 4,296,221

[45] Oct. 20, 1981

[54] PROCESS AND APPARATUS FOR INTERMITTENT POLYMERIZATION AT ELEVATED PRESSURE

[75] Inventor: Helmut Bauer, Basel, Switzerland

[73] Assignee: Maschinenfabrik Burckhardt AG, Basel, Switzerland

[21] Appl. No.: 135,122

[22] Filed: Mar. 28, 1980

[30] Foreign Application Priority Data

Apr. 26, 1979 [CH] Switzerland ............ 3960/79

[51] Int. Cl.³ .................... C08F 2/34; C08F 10/02
[52] U.S. Cl. ....................... 526/87; 422/131; 526/64; 526/88; 526/352.2; 526/918
[58] Field of Search ............... 526/88, 352.2, 918, 526/64, 87

[56] References Cited

U.S. PATENT DOCUMENTS 2,927,006  3/1960  Brooks .................... 526/88
3,649,208  3/1972  Hornschuch ............. 526/88
4,153,774  5/1979  Boettcher et al. ........ 526/64

Primary Examiner—Edward J. Smith

Attorney, Agent, or Firm—Kenyon & Kenyon

[57] ABSTRACT

The gas to be polymerized is introduced into the working zone of a high pressure piston compressor and is compressed in timed relation to a pressure suitable for the polymerization. The gas temperature suitable for the polymerization process at the end of the compression stroke is set by cooling or heating the gas before the gas enters the compressor. The catalyst or initiator activating the polymerization is introduced into the working zone of the compressor during the compression stroke or after completion thereof, e.g. with the aid of a controlled injection valve. The gas containing the polymer and expanded approximately to the initial pressure is passed out of the compressor into a separator and is here freed from the polymer, while the residual gas is re-cycled to the compressor by means of a blower. For the polymerization of high-pressure polyethylene, the gas is compressed to a final pressure of about 2500 kg/cm² at a temperature of about 130° C. in the working zone of the compressor before introduction of the catalyst. The compressor may operate in a two-stroke or four-stroke cycle.

15 Claims, 7 Drawing Figures

PROCESS AND APPARATUS FOR INTERMITTENT POLYMERIZATION AT ELEVATED PRESSURE

The invention relates to a process and apparatus for intermittent polymerization at elevated pressure.

As is known, polymerization at elevated pressure has attained great economic significance especially for the manufacture of low density polyethylene. In the present state of the art, ethylene gas is first brought to a preliminary pressure of about 250 kg/cm$^2$ and thereafter compressed in a compressor, as a rule a two-stage compressor, to the pressure required for the reaction, which is normally between 1500 and 2500 kg/cm$^2$, and occasionally even higher. Thereafter, the gas is heated to a temperature required to carry out the reaction; i.e. about 170° C. Thereupon, the gas is sent into a reactor where polymerization is brought about by a catalyst or initiator. Usually, one of two different types of reactors are used, namely autoclave reactors or tube reactors; both of which operate continuously.

Polymerization is an exothermic process and must be controlled so that a temperature of about 300° C. is not exceeded or the ethylene will decompose explosively. Depending on the reaction pressure employed, the yield of polyethylene is 18% to 28% of the quantity of gas supplied. Under the conditions prevailing in the reactor, this polyethylene is dissolved in the gas and therefore cannot readily be separated. In order to precipitate the polyethylene from the solution, the mixture must be expanded to a pre-pressure of, for example, 250 kg/cm$^2$. Then the product can be separated in the form of a hot liquid. The quantity of gas which did not participate in the reaction is then returned to the two-stage compressor for recompression to the reaction pressure. As a result, a quantity of gas which is a multiple of that participating in the reaction must be compressed to the high pressure. Further, the compression work expanded is lost in the following expansion. The energy requirement for the production of polyethylene by the known methods is therefore considerable.

Moreover, the apparatus required for the practice of these processes require considerable cost of instrumentation.

Accordingly, it is an object of the invention to provide an intermittent polymerization process which requires relatively low energy.

It is another object of the invention to provide for an intermittent polymerization of ethylene at relatively low energy consumption.

It is another object of the invention to provide a relatively simple apparatus for the intermittent polymerization of a polymerizable substance.

It is another object of the invention to provide for the polymerization of ethylene at relatively low cost.

Briefly, the invention provides a process and apparatus for an intermittent polymerization of a polymerizable substance such as ethylene.

In accordance with the process, a substance to be polymerized is supplied in gaseous form and in timed relation to a working zone of a pump or compressor which operates volumetrically between two pressure stages. Thereafter, the substance is compressed in the working zone to a predetermined pressure and temperature and a polymerization catalyst is added to the working zone, at the latest, in an initial range of expansion of the substance in the working zone in order to effect polymerization.

In accordance with the invention, the catalyst may be introduced into the working zone in the range of an upper pressure stage of the compressor or may be introduced in a controlled quantity over a predetermined range of the expansion stroke of the compressor. In any event, the pressure in the working zone is maintained constant during an initial expansion of the polymerized substance in the working zone.

In one embodiment, where the compressor operates in a two-stroke cycle, compression of the substance occurs during a first working stroke while polymerization and expansion occur in the following expansion stroke. Further, the charge containing the polymerized substance is removed (and fresh substance to be polymerized is supplied in the working zone) during a final portion of the expansion stroke.

Where the compressor operates in a four-stroke cycle, compression occurs during a first working stroke; polymerization and expansion occur during a second stroke; expulsion of the polymerized substance occurs during a third stroke and re-filling of the working zone with a fresh charge of substance occurs during a fourth stroke.

During operation, the first pressure stage is maintained below 300 kilograms/square centimeter, e.g. between 150 and 250 kilograms/square centimeter while the upper pressure stage is above 1,000 kilograms/square centimeter, e.g. between 2000 and 3000 kilograms/square centimeter.

The process may also exchange heat with the substance supplied to the working zone at lower pressure in order to set the temperature of the substance in the working zone at higher pressure to the desired value.

In accordance with the process, the polymerized substance is discharged from the working zone to a separator and residual unpolymerized substance is removed for re-cycling them to the working zone jointly with fresh substance to be polymerized.

The energy which is released during polymerization can advantageously be used in a work-expansion of the charge in the working zone.

In accordance with the invention, the catalyst is added before a temperature of 300° is reached in the working zone. To this end, the catalyst may also be added after a predetermined expansion of the substance has occurred in the working zone.

The apparatus is comprised of a volumetrically operable compressor having at least one working zone, a feed line connected to the working zone for supplying a polymerizable substance, such as ethylene, to the zone, a means for introducing a polymerization catalyst into the working zone and separating means which communicate with the working zone for receiving a polymerized charge therefrom and to separate unpolymerized substance from the polymerized substance.

In one embodiment, the compressor is in the form of a piston compressor. In this case, the compressor has a cylinder communicating with the working zone, a piston which is reciprocally mounted in the cylinder for movement over a given zone of the cylinder, an inlet to the working zone which is connected to the feed line, a suction valve for selectively opening and closing the inlet and a plurality of outlet ports in the zone of the cylinder over which the piston reciprocates for exhausting a polymerized charge therethrough.

The means for introducing the catalyst may be in the form of one or more injection valves.

Further, the apparatus may include a heat exchanger about the feed line for exchanging heat with the substance supplied to the working zone of the compressor.

Also, a safety means may be provided in the apparatus which is responsive to an overpressure in the working zone.

Figure 2:
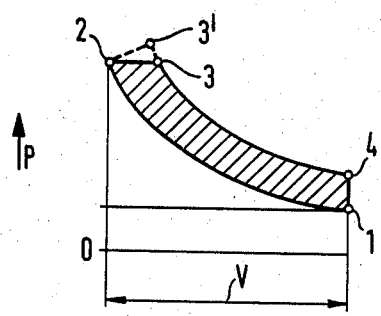
Figures 3A, 3B, 3C:
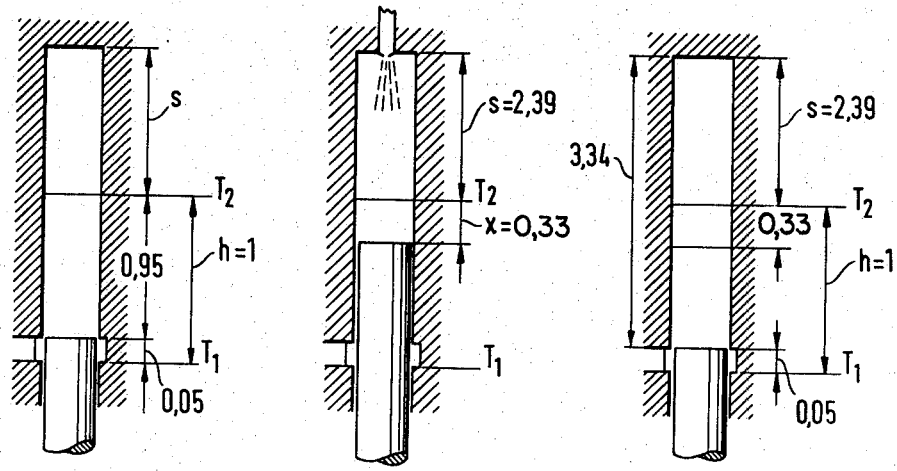
Figure 4:
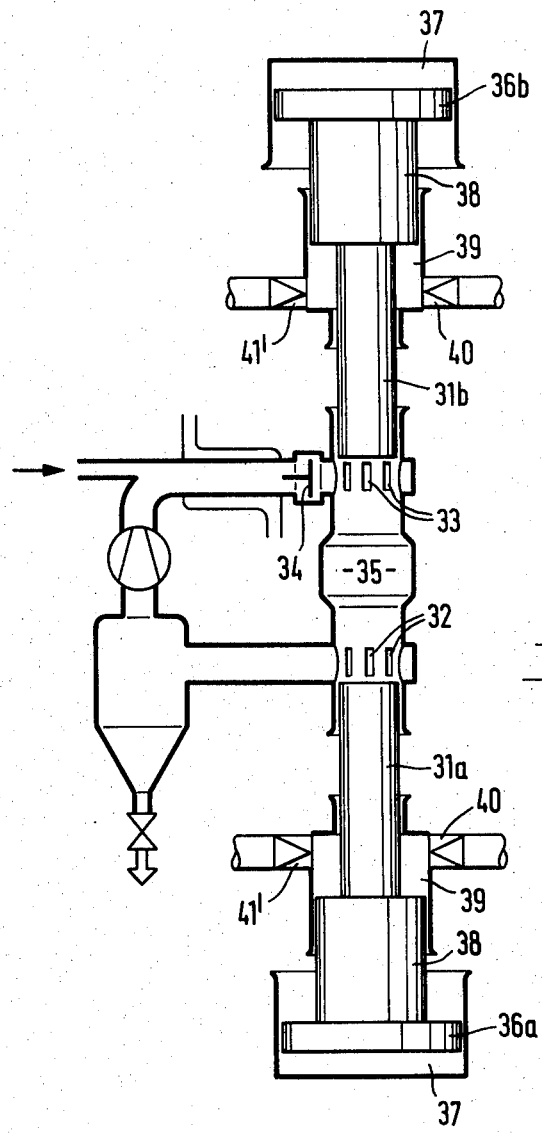
Figure 5:
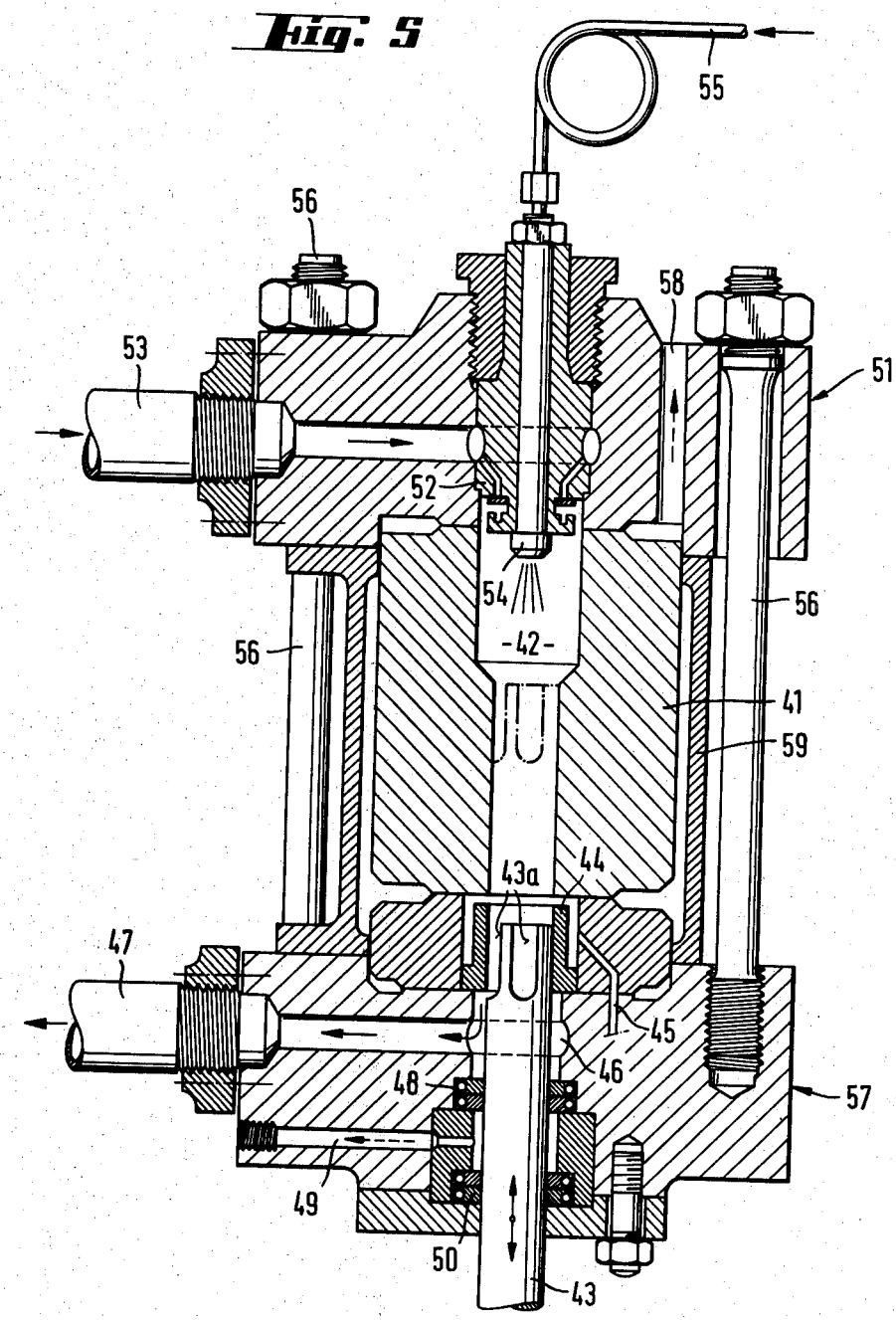

These and other objects and advantages of the invention will become more apparent from the following detailed description and appended claims taken in conjunction with the accompanying drawings in which:

FIG. 1 schematically illustrates an apparatus according to the invention employing a single-action piston compressor;

FIG. 2 illustrates a pressure-volume diagram for a process carried out in the apparatus according to FIG. 1 in accordance with the invention;

FIGS. 3a, 3b and 3c schematically represent various positions of a piston of the piston compressor according to FIG. 1;

FIG. 4 illustrates a modified apparatus in accordance with the invention having a double-piston compressor; and FIG. 5 illustrates a cross-sectional view of a piston compressor in accordance with the invention having an injection valve for a catalyst.

Referring to FIG. 1, the apparatus for an intermittent polymerization of a polymerizable substance, such as ethylene, is connected to a source of ethylene via a line 21. As illustrated, the apparatus includes a volumetrically operable pump or compressor 14 which has at least one working zone 13. In addition, the apparatus has a feed line 11 connected via a suction valve 12 to the working zone 13 for supplying the ethylene to the zone 13 from the line 21.

The compressor 14 has a cylinder which communicates with the working zone 13 as well as a piston 15 which is reciprocally mounted in the cylinder for movement over a given zone of the cylinder. In addition, a plurality of outlet ports 16 are provided in the zone of the cylinder over which the piston 15 reciprocates. These ports 16 communicate with a line 17 which opens into a separating means 18. As indicated, in FIG. 1, the upper end of the working zone 13 has an inlet which communicates with the feed line 11 and which is selectively opened and closed by the suction valve 12.

The separator 18 is constructed as a centrifugal separator. Alternatively, the separator 18 may be of a different type such as a separator with baffle plates, filters, and the like. The lower end of the separator 18 has a valve 19 through which liquid polymer can be removed as well as a line 20 at the upper end through which residual gas can be removed. This line 20 contains a blower 22 from which the residual gas can be recycled into the feed line 11.

A heat exchanger 23 is disposed about the line 20 for exchanging heat with the ethylene supplied to the working zone 13 of the compressor 14.

The compressor 14 also has a means (not shown) for introducing a polymerization catalyst into the working zone.

As indicated, the piston 15 reciprocates between an outer dead center position (as shown) and an inner dead center position 15a indicated by dash dot lines. During the working stroke from the outer dead center position to the inner dead center position 15a, the piston 15 compresses any gas which is in the working zone 13. The working zone 13, in turn, forms a reaction chamber in which a gas may be polymerized. The volume of the working zone 13 acts as a dead space which is relatively large compared with the stroke volume of the piston 15. As indicated, the piston 15 clears the outlet ports 16 in the outer dead center position such that the separator 18 communicates with the working zone 13 in order to receive a polymerized charge therefrom.

Gas which has not taken part in the reaction can be returned from the separator 18 via the line 20 and blower 22. This recycled gas can be added to fresh gas from the line 21 which may be precompressed in a compressor (not shown). The pressure conditions are selected so that a slightly higher pressure prevails in the feed line 11 than in the separator 18. Thus, the valve 12 will open automatically for scavaging and refilling of the working zone 13. The slight pressure difference between the separator 18 and the line 11 must overcome the opening resistance of the valve 12 and, thefore, the blower 22 is provided for recycling of the gas.

The heat exchanger 23 permits a heating or cooling of the gas so that a suitable temperature can be maintained in the gas flowing to the compressor 14.

The means for introducing the catalyst may be of any suitable type such as an injection valve. This is further described with respect to FIG. 5 below.

Referring to FIGS. 1 and 2, during operation, the substance to be polymerized, e.g. ethylene, is supplied in gaseous form in timed relation from the lines 20 and 21 via feed line 11 and the suction valve 12 into the working zone 13. When the piston 15 is at the outer dead center position as indicated at point 1 in FIG. 2, the stroke volume of the compressor is filled with ethylene under the pre-pressure prevailing in the feed line 11. Thereafter, the gas is compressed in the working zone 13 to a predetermined pressure and temperature by the working stroke of the piston 15. The gas is thus compressed along the line 1–2 as indicated in FIG. 2. By an appropriate dimensioning of the dead space, the desired reaction pressure at point 2 is reached precisely at the inner dead center position 15a of the piston. Further, during compression, the temperature of the gas increases. By a suitable selection of the temperature at point 1, the temperature appropriate for the desired reaction can be obtained at point 2, for example by exchanging heat with the gas supplied to the working stage 13 via the heat exchanger 23. Accordingly, at point 2, both pressure and temperature have the predetermined values which are required for initiation of polymerization by the catalyst.

The polymerization catalyst is added to the working zone 13 at the latest in an initial range of expansion of the gas in the working zone 13 in order to effect polymerization. To this end, it is advisable to introduce exactly proportioned amounts of catalyst from point 2 on in fine division into the working zone 13. From point 2 to point 3 an exothermic polymerization takes place with the temperature of the gas increasing very rapidly. As cooling is impossible because of the short time, the gas pressure would increase in accordance with the rising temperature (point 2 to point 3'). However, as the piston 15 is in an expansion stroke, an increasing volume becomes available to the expanding polymerized substance. Thus, by a suitable selection of the operating conditions, polymerization from point 2 to point 3 may occur at constant pressure, i.e. without any appreciable pressure change.

In order to avoid a temperature rise above 300° C., and thus reduce the danger of explosive decomposition of the gas, the reaction is interrupted in time at point 3 (FIG. 2). This is effected in a simple manner by an appropriate proportioning and interruption of the catalyst supply. The catalyst must be spent at point 3 as to action so that the reaction will stop.

As the piston 15 continues to travel in the expansion stroke, expansion of the hot gas occurs from point 3 to point 4. When the piston reaches the final portion of the expansion stroke, the outlet ports 16 are cleared. The partly polymerized charge is then completely removed via the ports 18 during the final portion of the expansion stroke of the cylinder 15. Discharge of the contents of the cylinder then occurs from point 4 to point 1 via the line 17 to the separator 18.

The charge which is received in the separator 18 then separates into gas and hot liquid polymer via a precipitation of the polymer from its previous dissolved state due to the pressure drop from point 4 to point 1. The hot polymer can then be removed via the valve 19 while the residual gas is recycled via the blower 22 and line 11 to the working zone 13. The working zone 13 is then filled with a fresh charge and the cyclic process begins again.

The diagram of FIG. 2 is greatly simplified. Thus, during the polymerization, a pressure increase could take place despite the beginning expansion stroke, e.g. along the dotted line 2-3'. Further, point 4 is displaced a little toward the inner dead center according to the opening of the outlet formed by port 16, which begins before the outer dead center position 15a.

The continuous line 1-2-3-4-1 outlines a positive hatched area, i.e. in the process described energy is given off, in contrast to previous processes which consume energy without recovery.

In order to produce products having different properties, it may be desirable to carry out the polymerization at appropriately adapted reaction pressures. This can be done in a manner known in itself, e.g. by variation of the dead space or of the piston stroke. Control of the change of charge between point 4 and point 1 could alternatively be effected e.g. with controlled valves. However, the two-stroke system according to FIG. 1, where valve 12 is constructed as an automatic suction valve, is especially simple.

Referring to FIG. 3a, for a cylindrical working zone and under the simplifying assumption that the process is adiabatic and that the piston moving between the outer dead center $T_1$ and the inner dead center $T_2$ seals hermetically, the following exemplary conditions result for the compression:

| | | |
|---|---|---|
| Initial pressure $p_1$ | = | 250 kg/cm$^2$ |
| Initial temperature t | = | 40° C. |
| Specific volume $v_1$ | = | 2.53 l/kg |
| Enthalpy $i_1$ | = | 95 kcal/kg |

For the end state of compression at point 2, the following values are given e.g. for the compressor shown schematically in FIG. 3a:

| | | |
|---|---|---|
| Final pressure $p_2$ | = | 2500 kg/cm$^2$ |
| Temperature $t_2$ | = | 130° C. |
| Specific volume $v_2$ | = | 1.81 l/kg |
| Enthalpy $i_2$ | = | 198 kcal/kg |

Assuming a lost motion of 5% for the outlet ports 16, the following equation results for the dead space:

$$\frac{0.95 + s}{s} = \frac{v_1}{v_2}$$

Hence, s=2.39 if the total stroke h of the piston is taken as 1.0.

According to FIG. 2, the injection of the catalyst is expediently controlled so that the pressure remains approximately constant during the polymerization. As the process is exothermic and heat transfer is not possible because of the short time available, the temperature rises very quickly. By stopping the injection of catalyst, the process is expediently interrupted in such a way that at point 3 a temperature of 300° C. is not exceeded. For pure ethylene, for instance the following end state results at point 3:

| | | |
|---|---|---|
| $p_3$ | = | 2500 kg/cm$^2$ |
| $t_3$ | = | 300° C. |
| $v_3$ | = | 2.06 l/kg |
| $i_3$ | = | 308 kcal/kg |

For the piston path x traveled during injection according to FIG. 3b:

$$\frac{s}{x + s} = \frac{v_2}{v_3}$$

Hence x=0.33, i.e. the injection of catalyst occurs over the first 33% of the expansion stroke.

For the actual expansion, according to FIG. 3c the value for the specific volume before the opening of the outlet ports is:

$$\frac{3.34}{2.39 + 0.33} = \frac{v_4}{v_3}$$

Hence $v_4$=2.53 and one obtains the following parameters before the opening of the outlet ports:

| | | |
|---|---|---|
| $p_4$ | = | 1100 kg/cm$^2$ |
| $t_4$ | = | 247° C. |
| $v_4$ | = | 2.53 l/kg |
| $i_4$ | = | 238 kcal/kg |

After the opening of the outlet ports, the pressure drops abruptly from 1100 to 240 kg/cm$^2$, comparable with the abrupt pressure decrease brought about by periodical opening of valves in polymerization by means of tube reactors. The cylinder is thereby cleaned of residues. Thereafter, the inlet valve opens and the cylinder is flushed and filled with fresh gas.

The energy yield is dependent on possible leakage losses, which in turn are influenced by the selection of the seal between piston and cylinder.

Referring to FIG. 4, the apparatus for intermittent polymerization may also use a compressor which is in the form of a double-piston compressor having oppositely disposed pistons 31a, 31b facing the working zone 35. As indicated, the pistons 31a, 31b move in opposite directions. In the position shown, one piston 31a has opened an outlet port 32 while the other piston 31b opens an inlet port 33. In order to prevent the relatively high pressure which occurs at point 4 (FIG. 2) from rebounding into the feed line, a check valve 34 is provided in the feed line. As soon as the pressure drops to point 1 (FIG. 2), the cylinder is flushed and filled with fresh gas. Both pistons 31a, 31b then move inwardly simultaneously to compress the gas along the line 1–2 and push the gas into the working zone (reaction chamber) 35.

The counter-motion of the pistons 31a, 31b can be brought about forcibly by a crank drive (not shown). Examples of such arrangements are known from diesel engine construction.

According to FIG. 4, a crank drive may be avoided by connecting each piston 31a, 31b with a larger piston 36a 36b which rests on a pressure gas cushion 37. After completion of the cylinder filling, the pressure in the gas cushions 37 drives the pistons 31 inwardly, compressing the gas and pushing the gas into chamber 35. As soon as energy is generated by the polymerization, both pistons 31 are pushed outward again and the pistons 36 compress the gas in the cushions 37 and store energy there for the next compression stroke.

The counter-motion of the pistons 13 may be ensured by a synchronizing gear train (not shown) which in itself is known.

The energy generated by this machine, however, cannot be used for the direct drive of a generator because there is no rotary motion. Hence, the energy must be utilized in another manner, in that e.g. compressor pistons 38 are driven. The gas compressed by the pistons 38 in the cylinder 39 can subsequently serve to drive a turbine. Also, the process gas which is added to the cycle can be precompressed by the pistons 38. Suitable feed and discharge lines 40, 41' provided with valves are also provided for the gas in the cylinders 39.

A drive according to FIG. 4 without a crank shaft is analoguously possible also in the arrangement according to FIG. 1 with one piston only.

Referring to FIG. 5, the compressor which is schematically shown in FIG. 1, has a cylinder 41 with a working zone 42 serving as a reaction chamber. The cylinder 41 is a thick-walled forging and can, if necessary, be strengthened by shrinking. The piston 43 constructed as a plunger is guided and sealed in a bushing 44. To improve the seal and reduce wear, a suitable lubricant can be supplied to the bushing 44 through a bore 45. Without any major change of construction, the piston seal can also be effected in other ways, e.g. with piston rings.

In the position shown, the piston 43 provided with recesses 43a clears the outlet ports 46 and the cylinder content empties over line 47 into the separator (not shown) in which a pressure of for example 240 kg/cm$^2$ prevails. By conventional seal elements 48, this pressure is sealed from the outside and any leakage losses are passed through the channel 49. Another seal element 50 prevents escape of gas into the open.

An automatic inlet valve 52 of conventional construction is disposed in the valve head 51 to which the gas is supplied via a line 53. An injection nozzle 54 for the catalyst is disposed concentrically in this valve head 51 and the catalyst is supplied via a line 55.

A safety means is also provided in the compressor which is responsive to an overpressure in the working zone or chamber 35. As illustrated, the safety means includes a ring of long elastic screws 56 which secure the valve head 51 and a bottom piece 57 together. In addition, bores 58 are provided in the valve head 51 to communicate with a zone between the cylinder 41 in valve head 51. In the case an unforseen overpressure occurs in the cylinder 41, the screws 56 can elongate without exceeding the elastic limit so that the valve head 51 lifts off the cylinder 41. The overpressure can then escape without danger through the bores 58.

A heating jacket 59 surrounds the cylinder 41 in order to keep the cylinder warm during standstill. In this way, solidification of the polymerized product can be avoided.

The invention is not limited to the described embodiments. In principle, the process explained in FIG. 1 could be carried out in any volumetric machine in which a volume is present whose size varies periodically. The known models of rotating machines, however, are less well suited for handling the extremely high pressures. This is why it is advisable to use pistons and cylinders, because the problems of strength and seal can then be solved with known means of technology.

As the diagram of FIG. 2 has a strong similarity with the diagram of a diesel engine, the process can be carried out both in two-stroke and in four-stroke operation.

In two-stroke operation, the change of charge 4–1 occurs near the outer dead center position by the opening of ports and/or valves in known manner.

In four-stroke operation, there follows after the expansion stroke 2-3-4 in known manner, a third stroke for expulsion of the charge and a fourth stroke for filing the cylinder with fresh charge.

The catalyst or initiator may be any known substances which can be used for high-pressure polymerization of ethylene such as gases or liquids. For example, oxygen radical-forming substances such as azo compounds and peroxides may be used. Besides the actual catalysts or initiators, so-called chain transferrers, e.g. hydrogen or aliphatic or alicyclic hydrocarbons may also be present in the reaction chamber, as known.

For the actual introduction of the catalyst, injection valves are suitable which—if the catalyst is injected in liquid solution or form—may be constructed in a manner similar to the valves known for fuel injection in diesel engines. Such valves also permit quantitative proportioning with known means as well as an adjustment of start and end of injection. This makes it possible to introduce the catalyst over a predetermined range of the expansion stroke, in particular in a manner controlled by the pressure between points 2 and 3 (FIG. 2), in such a way that the injected quantity is reduced or cut off entirely, should the pressure in the reaction chamber increase excessively. To this end, known electronic controls are available.

Because the properties of the polymer may depend on the pressure state during the polymerization, it is advisable to control the process in the sense of a pressure in the working zone of the compressor by maintaining the pressure approximately constant over an initial range of the expansion stroke.

However, for certain polymer grades it is possible to operate without such a control. In such a case, the catalyst can be introduced into the reaction chamber in predetermined quantity during the compression stroke. The polymerization then takes place when the state necessary for the reaction with respect to pressure and temperature is reached. The polymerization may then possibly set in before the inner dead center position of the compressor piston is reached. Nor is it necessary that introduction of the catalyst takes place during the expansion stroke in the immediate range of the inner dead center position of the compressor piston. Introduction may alternatively take place only after a predetermined catalyst-free expansion of the gas present in the working zone of the compressor. Thus, the polymerization pressure can be adjusted to a suitable value with respect to the desired product grade.

For the lower pressure stage of the cyclic process, i.e. for the pressure according to point 1 in the diagram of FIG. 2, a value is chosen below 300 kg/cm$^2$, preferably a value between 150 and 250 kg/cm$^2$. The upper pressure stage is expediently above 1000 kg/cm$^2$, preferably between 2000 and 3000 kg/cm$^2$.

The invention is not limited to the polymerization of ethylene and can be applied to the production of other polymers with the use of suitable catalysts or initiators.

What is claimed is:

1. A process for an intermittent polymerization comprising the steps of
   supplying a substance to be polymerized in gaseous form in timed relation to a working zone of a pump or compressor volumetrically operable between two pressure stages;
   thereafter compressing the substance in the working zone to a predetermined pressure and temperature; and
   adding a polymerization catalyst to the working zone at the latest in an initial range of expansion of the substance in the working zone to effect polymerization.

2. A process as set forth in claim 1 wherein the catalyst is introduced into the working zone in the range of an upper pressure stage of the compressor.

3. A process as set forth in claim 1 wherein the catalyst is introduced in controlled quantity over a predetermined range of the expansion stroke of the compressor.

4. A process as set forth in claim 1 wherein the pressure in the working zone is maintained constant during an initial expansion of the polymerized substance in the working zone.

5. A process a set forth in claim 1 wherein the compressor operates in a two-stroke cycle with compression of the substance occurring during a first working stroke and polymerization and expansion occurring in a following expansion stroke and wherein the charge containing the polymerized substance is removed (and fresh substance to be polymerized is supplied into the working zone) during a final portion of said expansion stroke.

6. A process as set forth in claim 1 wherein the compressor operates in a four-stroke cycle with compression of the substance occurring during a first working stroke; polymerization and expansion during a second stroke; expulsion of the polymerized substance during a third stroke; and re-filling of the working zone with a fresh charge of substance during a fourth stroke.

7. A process as set forth in claim 1 wherein one pressure stage is below 300 kilograms/square centimeter and the other pressure stage is above 1000 kilograms/square centimeter.

8. A process as set forth in claim 7 wherein said one pressure stage is between 150 and 250 kilograms/square centimeter and said other pressure stage is between 2000 and 3000 kilograms/square centimeter.

9. A process as set forth in claim 1 which further comprises the step of exchanging heat with the substance supplied to the working zone at lower pressure to set the temperature of the substance in the working zone at higher pressure to the desired value.

10. A process as set forth in claim 1 which further comprises the step of discharging the polymerized substance from the working zone to a separator and removing residual unpolymerized substance therefrom for re-cycling them to the working zone jointly with fresh substance to be polymerized.

11. A process as set forth in claim 1 wherein the energy released during polymerization is used in a work-expansion of the charge in the working zone.

12. A process as set forth in claim 1 wherein the catalyst is added after a predetermined expansion of the substance in the working zone.

13. A process for intermittent polymerization comprising the steps of
   supplying a substance to be polymerized in gaseous form to a working zone of a compressor;
   compressing the substance in the working zone to a predetermined pressure range and temperature range, adding a polymerization catalyst to the working zone to effect an exothermic polymerization of the substance; and
   expanding the charge in the working zone.

14. A process as set forth in claim 13 wherein the addition of catalyst is completed before a temperature of 300° C. is reached in the working zone.

15. A process as set forth in claim 13 wherein the substance is ethylene.

* * * * *